March 21, 1961  F. J. BRAUNER  2,975,488
METHOD OF MOLDING ARTICLES OF MANUFACTURE
Filed Sept. 19, 1958
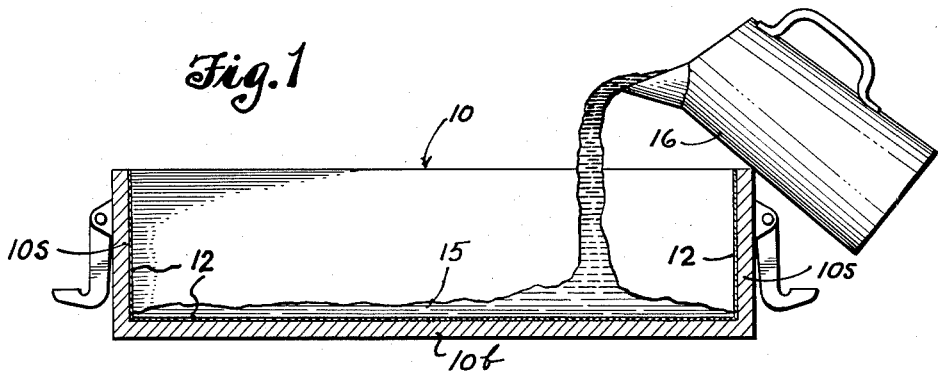
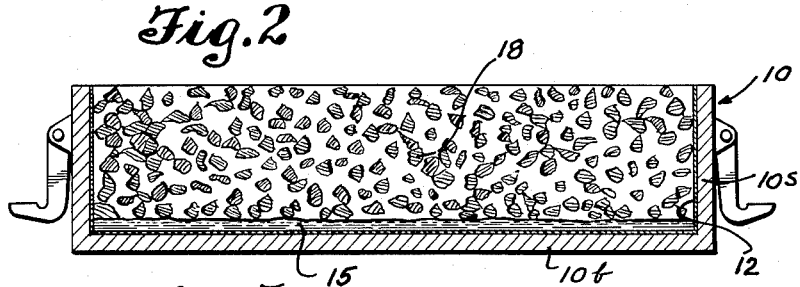
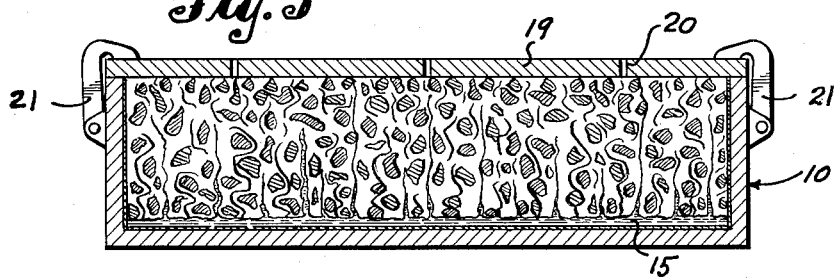
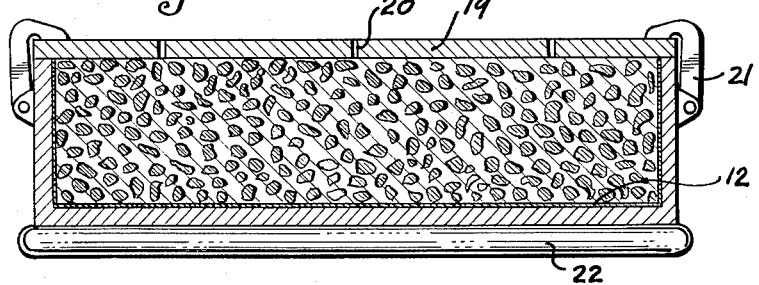
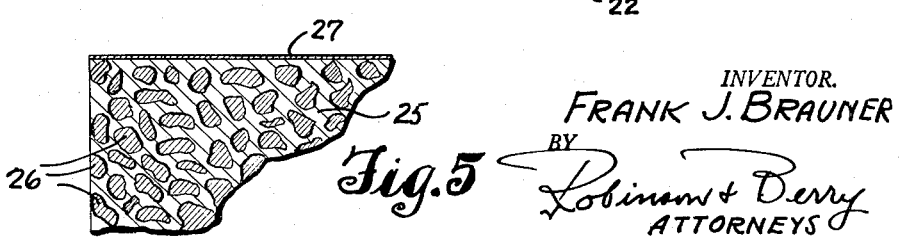
INVENTOR.
FRANK J. BRAUNER
BY
Robinson & Berry
ATTORNEYS

United States Patent Office 2,975,488
Patented Mar. 21, 1961

2,975,488

METHOD OF MOLDING ARTICLES OF MANUFACTURE

Frank J. Brauner, Box 187, Black Diamond, Wash.

Filed Sept. 19, 1958, Ser. No. 761,978

2 Claims. (Cl. 18—59)

This invention relates to molded products and materials and to the novel process or method of their manufacture. More particularly, the present invention relates to the molding of a serviceable and relatively inexpensive building material in block, sheet or various other forms according to desires or requirements.

It is the primary object of this invention to provide a light weight, water resistant, strong, non-fusible and long wearing building material in various shapes or forms from an aggregate comprising fibers, pellets or pieces, which may be of vegetable, mineral or animal origin and which are bonded together in a unitary mass by use of a foaming plastic agent.

It is a further object of the present invention to provide products of the above kind that, can be molded or shaped to suit various requirements or desires; which can be sawed and nailed if such is desired, and which are practical for use as building elements, such as sheathing, walls, or for various insulating and acoustical purposes.

Further objects of the invention reside in the sequence of steps involved, and in the simplicity of the manufacturing operation. Also, in the advantages residing in the various uses of the products of the present method.

In carrying out the present process or method of manufacture, I first prepare a mold or form and then pour therein a designated or predetermined amount of a selected foaming plastic, such as polyurethanes, polyethers, polyesters, phenolics, polystyrene, polyvinyl, etc., that may be caused to foam and after foaming will cure or set. Then over this plastic, as contained in the mold or form, and before it has been caused to foam, I pour the prepared aggregate. This may be any one of a variety of selected materials or a mixture of materials. Preferably, the aggregate is made up of small, irregularly shaped pieces of material of fibrous, or pellet form. It may be of vegetable origin, such as wood fibers, chips, slivers, small chunks or pieces of wood or bark, shredded corn stocks, straw or the like. Furthermore, the aggregate may be fiber glass, steel wool, hair or materials of that character. After the mold or form has been filled to the required extent by the selected aggregate, a cover is placed on the mold and secured in closed position.

The third step of the process resides in applying heat, or doing what may be necessary, to activate the plastic material and bring about a good foaming action therein. This causes the plastic foam to rise into and fill all the voids of the aggregate and thus completely fill the mold.

The final step of the process resides in causing and allowing the plastic, after foaming has stopped, to set or cure and, when this step is finished, the solidified product is removed from the mold.

It will here be mentioned that it is further anticipated that the mold might be lined with sheets of paper, metal or fabric before receiving the plastic or aggregate, thus to insure that the final product will not adhere to its inside surfaces. This application of liners is practical in the making of building panels or tile. When such linings are contained in the mold, they become bonded to the surfaces of the molded articles and will be stripped from the mold by the removal of the finished article. While the use of such linings is not a prerequisite to the manufacture of the article, it is in most instances quite desirable.

In order to better explain and to further illustrate the sequence of steps of the present process of manufacture, and also to show the character of the finished article, I have provided the accompanying drawings, wherein:

Fig. 1 is a view showing the initial step of applying a selected foaming plastic material to a mold that has been lined with sheets of paper or other selected material and in which mold an article is to be formed in accordance with the present process. The plastic at this time is in the nature of a syrup like liquid.

Fig. 2 is a view illustrating the filling of the mold, above the plastic therein, with the selected aggregate, ready for the closing and sealing of the mold by applying a cover thereto.

Fig. 3 is a view illustrating the step of causing the plastic to foam and thus to rise in and fill the voids of the aggregate and thus fill the mold.

Fig. 4 is a view illustrating the period for the setting of the foaming plastic in the mold to complete the article.

Fig. 5 is a cross-sectional view of a piece of material formed by the present process.

Referring more in detail to the drawings:

10 designates what may be an open mold of box form as provided for the practicing of the present process. It comprises a bottom 10b and surrounding sidewalls 10s. The mold may be of metal, wood, a ceramic or other suitable materials. As shown in Fig. 1, the mold has its bottom 10b and sides covered or lined interiorly with thin sheet material 12 such as paper, cloth or metal designed to prevent the formed article sticking to this surface of the mold. This view illustrates the first step of the process, that is, the pouring of a selected plastic, 15, from a container 16 into the mold. The amount of plastic to be used is predetermined as being that required upon foaming to completely fill the voids of the aggregate and also the mold. The plastic, in this form, is a fluid of the consistency of thin syrup.

In Fig. 2, I have designated the selected aggregate at 18. This is used in such an amount as to substantially fill the mold. The mold is then covered and closed by a lid 19 which is vented, as for example, at 20. This lid is secured in place by suitable releasable means, designated at 21, to withstand any internal pressure to which the mold may be subjected during the foaming period.

With the lid thus secured in place, the plastic is then activated by heat or otherwise to cause foaming. Heat may be applied for this purpose in various ways, for example, by subjecting the filled mold to room heat or by directly heating the mold bottom. In Fig. 4 an electric heater for this purpose is designated by numeral 22.

The heating of the plastic causes it to foam. The foam therefrom rises and fills all the voids of the aggregate and also fills the mold. When foaming has stopped, a setting or curing period is allowed. Then the mold is opened and the formed article lifted therefrom. The article formed will be found to be a solid, infusible mass of a specific gravity of .4 and lower depending on the amount of plastic used and by varying amount of blowing agent. It will retain the shape given it in the mold, and will not shrink or warp.

In Fig. 4, I have shown, in cross-section, a fragment of a molded article. In this view, the foam plastic is designated by the cross-hatched areas 25 and the aggregate material by the areas 26. The surfacing sheet of paper, or cloth is designated by numeral 27.

This process is practical for and can be economically employed in the making of panels of sheathing; for wall tiles, unsinkable bell buoys, boats and the like. Materials may be made in various shapes, thicknesses and sizes. Containers, large or small, may be molded therefrom and put to various uses where insulating properties and water resistance is desirable. Likewise, articles such as boats, may be economically formed.

The present product as made by use of a modified phenolic resin is water resistant and has excellent insulating properties both in respect to sound and temperature. It can be molded to provide structural members of special as well as standard shapes. Its hardness can be varied by regulating the amount of plastic used and pressure under which it is confined in the mold. The internal pressure in molding has a range of from 30 to 50 pounds per square inch.

It is also possible by use of varied amounts of selected resins to vary the density of the products made and to produce products that are flexible, and also to produce some that have great rigidity. Weight varies with the density of the product.

What I claim as new is:

1. The process of manufacturing a solid, non-fusible construction product comprising providing a mold for the article to be formed, partially filling said mold with a predetermined amount of synthetic resin of the type adapted to be foamed by heating, said amount of resin being that required when foamed to substantially completely fill the mold, filling the remainder of the mold with a relatively light weight non-fusible aggregate in the form of small discrete irregularly shaped particles, closing and sealing the mold, heating the material in the mold thereby causing the resin to foam at a pressure of 30 to 50 pounds per square inch and completely fill the mold and completely envelop the said aggregate, cooling said resin thereby causing said resin to set, and removing the molded product from the mold.

2. The process as described in claim 1 wherein the product formed has a specific gravity of .4 or lower.

References Cited in the file of this patent
UNITED STATES PATENTS

| | | |
|---|---|---|
| 2,194,036 | Talalay | Mar. 19, 1940 |
| 2,802,766 | Leverenz | Aug. 13, 1957 |